United States Patent [19]

Butcher

[11] Patent Number: 4,667,333
[45] Date of Patent: May 19, 1987

[54] AUTOMATIC CLOCK RECOVERY CIRCUIT

[75] Inventor: James S. Butcher, Glendale Heights, Ill.

[73] Assignee: Motorola, Inc., Schaumburg, Ill.

[21] Appl. No.: 564,975

[22] Filed: Dec. 22, 1983

[51] Int. Cl.⁴ .............................................. H04L 7/00
[52] U.S. Cl. .................................... 375/106; 328/133; 331/1 R
[58] Field of Search .................. 375/81, 97, 101, 106, 375/111, 120, 121, 82, 119; 328/63, 72, 133; 307/262, 269; 331/1 R, 1 A

[56] References Cited

U.S. PATENT DOCUMENTS

| | | | |
|---|---|---|---|
| 3,585,298 | 6/1971 | Liberman | 328/63 |
| 3,609,560 | 9/1971 | Greenburg | 375/111 |
| 3,646,452 | 2/1972 | Horowitz et al. | 375/120 |
| 3,697,689 | 10/1972 | Gibson | 375/119 |
| 3,777,272 | 12/1973 | Fletcher et al. | 375/81 |
| 3,818,347 | 6/1974 | Holsinger | 371/81 |
| 4,001,713 | 1/1977 | Egan | 331/1 A |
| 4,027,261 | 5/1977 | Laurent et al. | 328/63 |
| 4,048,581 | 9/1977 | Lyberg | 331/1 A |
| 4,151,485 | 4/1979 | La Fratta | 331/1 A |
| 4,213,006 | 7/1980 | Gerges | 375/97 |
| 4,216,544 | 8/1980 | Boleda et al. | 375/119 |
| 4,280,224 | 7/1981 | Chethik | 375/116 |
| 4,288,874 | 9/1981 | Yamada | 375/120 |
| 4,302,845 | 11/1981 | McClaughry et al. | 375/82 |
| 4,356,566 | 10/1982 | Wada et al. | 375/116 |
| 4,375,694 | 3/1983 | Kuln | 375/120 |
| 4,400,817 | 8/1983 | Sumner | 375/119 |
| 4,411,000 | 10/1983 | Kustka | 375/80 |
| 4,516,250 | 5/1985 | Grimes | 375/82 |

Primary Examiner—Robert L. Griffin
Assistant Examiner—Stephen Chin
Attorney, Agent, or Firm—Raymond A. Jenski; Rolland R. Hackbart

[57] ABSTRACT

An automatic clock recovery circuit is described. The automatic clock recovery circuit samples a received data signal with a recovered clock signal and advances or retards the recovered clock signal based on the comparison between the received data signal and the recovered clock signal. The automatic clock recovery circuit selectively cancels advance or retard corrections in the presence of bias distortion and phase ambiguities to improve the lock acquisition time for recovered clock.

2 Claims, 6 Drawing Figures

AUTOMATIC CLOCK RECOVERY CIRCUIT

BACKGROUND OF THE INVENTION

1. Field of the Invention

This invention relates to the field of portable communications and specifically to a data transceiver circuit which aligns the transitions of a receiver internal data clock with the transitions of a received data signal.

2. Description of the Prior Art

Portable radio transceivers are used in several facets of communications technology. Portable data transceivers can be found in paging systems, and two-way communications systems such as those used by police and other public servants. Recently portable radio transceivers have found use in portable data terminals which are used to communicate with a host computer. Portable data terminals of this type can provide on-site computer diagnostics of a second host computer.

Most devices which are used for data communications are operated in a synchronous mode, that is, the local clock signal used to operate the portable data terminal is phase compensated so that the transitions of the local clock signal are aligned with the transitions of an incoming data signal.

Several well-known techniques have been developed for synchronizing a local clock to a received data signal. One common technique advances or retards the local clock signal by adding on pulses from a signal fed to a frequency divider chain which provides a local signal. Another technique for clock recovery utilizes a programmable divider coupled to a reference clock signal. The recovered clock signal is compared to the received data signal and the divider is programmably altered to shift the phase of the recovered clock. This latter technique for phase adjustments is described in a U.S. Pat. No. 4,400,817 issued Aug. 23, 1983 entitled "Method and Means of Clock Recovery in a Received Stream of Digital Data" by Terrence E. Sumner and assigned to the assignee of the present invention.

The above-mentioned techniques for clock recovery operate effectively in most circumstances. However, these techniques require a relatively large amount of time to acquire a recovered clock signal in the presence of data bias distortion occurring in the limiter stage and phase ambiguities. In many situations a phase-ambiguity may exist and the phase compensation circuit may effect an improper phase adjustment resulting in an extended time required to achieve data synchronization.

SUMMARY OF THE INVENTION

Accordingly, it is an object of the present invention to provide a programmable clock recovery circuit wherein bias distorted data phase ambiguities are eliminated.

It is a further object of the present invention to provide a programmable clock recovery circuit which can achieve a locked state at a rapid rate.

It is yet another object of the present invention to provide a clock recovery circuit which can adaptively advance or retard a local clock signal based on whether an advance or retard correction occurred in a previous cycle.

It is yet another object of the present invention to provide a clock recovery circuit which inhibits phase corrections to correct phase ambiguities.

Briefly described, the present invention contemplates a programmable clock recovery circuit for aligning the transitions of a local recovered clock signal to the transitions of a received data signal. The automatic clock recovery circuit advances or retards the phase of a recovered clock signal depending on the relative phase of the received data signal and recovered clock signal. In addition, the present invention contemplates an automatic clock recovery circuit which disables a retard correction immediately following an advance correction and disables an advance correction based on certain phase conditions between the received data signal and the recovered clock signal.

DETAILED DESCRIPTION OF THE PREFERRED EMBODIMENT

Figure 1:
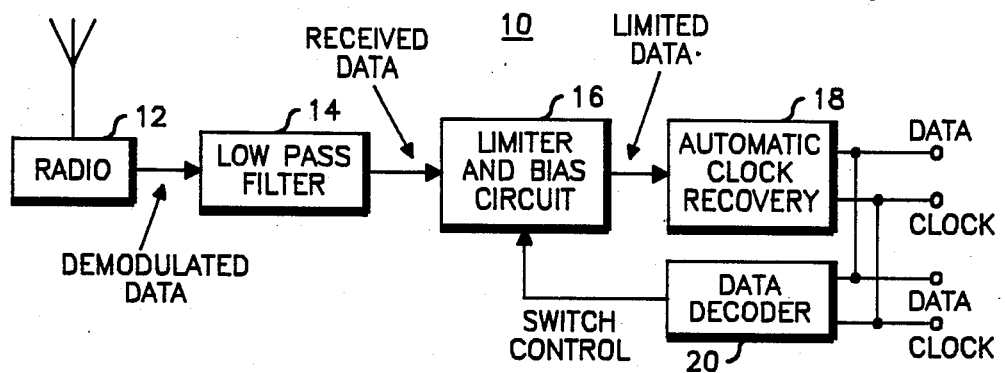
FIG. 1 is a block diagram of a digital data receiver of the type which would utilize the present invention.

FIG. 1 is a block diagram of a digital data receiver of the type which would utilize the present invention. A typical digital data receiver comprises a conventional R.F. receiver 12 which provides an output signal comprising demodulated data. A low pass filter 14 recovers the received data from the demodulated data. The received data is processed by a limiter and bias circuit and limiter 16 which processes the received data to provide binary 1-0 information and to reduce transition jitter in the received data signal. The processed received data signal, referred to as limited data, is coupled to an automatic clock recovery circuit 18 of the present invention which samples the incoming data and recovers a timing clock signal from the limited data signal. The automatic clock recovery circuit shown in FIGS. 3 and 4 of the present invention is utilized in the automatic clock recovery circuit 18. The digital data receiver 10 is additionally equipped with a data decoder 20 which continuously monitors the data channel for digital coded messages and may be used to control the limiter and bias circuit 18. An adaptable bias circuit of the type described in FIG. 1 is described in detail in a U.S. patent application Ser. No. 564,974 now U.S. Pat. No. 4,575,863 entitled "Fast Recovery Bias Circuit", by the inventor of the present application, assigned to the assignee of the present invention, and filed the same day as the present invention, and herein incorporated by reference. The data decoder 20 is also further described in the above-mentioned patent application as well as U.S. patent application Ser. No. 441,327 entitled "Method And Apparatus For Dynamically Selecting Transmitters For Communications Between A Primary Station And Remote Stations Of A Data Communications System", by Thomas A. Freeburg filed Nov. 11, 1982, and assigned to the assignee of the present invention and herein incorporated by reference.

Figure 2A:
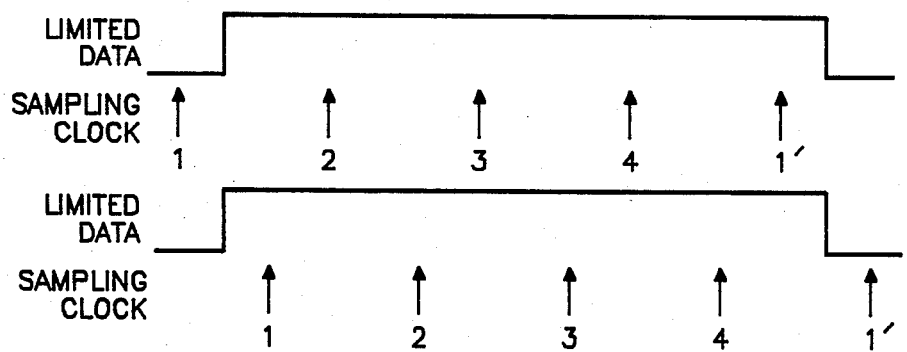
FIG. 2a is a timing diagram showing two possible phase relationships between an undistorted limited data signal and the recovered local clock signal.
Figure 2B:
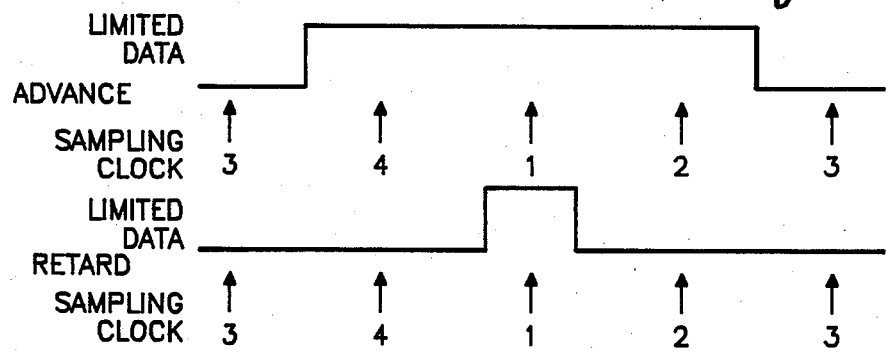
FIG. 2b is a timing diagram showing possible phase relationships between a bias distorted limited data signal and the recovered local clock signal.

FIGS. 2a and 2b show a set of timing diagrams which show several possible phase relationships between an incoming data signal and the receiver local clock signal. As mentioned earlier the present invention aligns the transitions of the receiver local clock with the transitions of the received data signal. Referring now to FIG. 2a, a first set of possible phase relationships is shown. A recovered clock signal is used to sample the limited data signal to generate the comparison information used to operate the recovered clock phase adjustment circuit of FIGS. 3 and 4.

According to FIG. 2a, the phase of the recovered clock signal can lead or lag with respect to the limited data signal. The sampling clock signal is operated at a rate which is four times the rate of the recovered clock signal. Therefore, according to the principles of the present invention, each comparison period is based on 4 samples of the limited data signal. If the limited data signal essentially has no bias distortion, as in FIG. 2a, the recovered clock signal will be retarded if samples 1 and 3 are different or advanced if samples 3 and 1 are different. This correction forces sample 1 to occur near limited data transitions.

FIG. 2b shows a second set of timing diagrams which show out-of-phase relationships between a bias distorted limited data signal and the sampling clock signal. According to the first timing diagram shown in FIG. 2b the limited data signal is 180° out-of-phase with the recovered clock and has three equal samples. Since samples 3 and 1 have different values, an advance correction is indicated. Immediately following this advance correction a retard correction is also indicated since samples 1 and 3 are different. This retard correction is disabled to affect a net advance correction, thus preventing an out-of-phase lock-up condition which would result from an advance followed by a retard correction.

The second timing diagram of FIG. 2b shows a highly bias distorted limited data signal which is 180° out-of-phase with the recovered clock and sample 1 is unique.

Since samples 3 and 1 are different, an advance correction is indicated but is disabled because samples 1 and 2 are different. A net retard correction occurs since samples 1 and 3 are different. This characteristic of the clock recovery circuit allows for faster recovered clock acquisition where the limited data is initially highly bias distorted and centered anywhere in the region from sample 1 to a point between samples 3 and 4.

The present invention therefore provides that a retard correction immediately following an advance correction is canceled to insure that contradictory phase adjustments do not adversely affect clock acquisition time. The present invention further provides that if samples 1 and 2 are not the same, an advance correction will be canceled.

Figure 3:
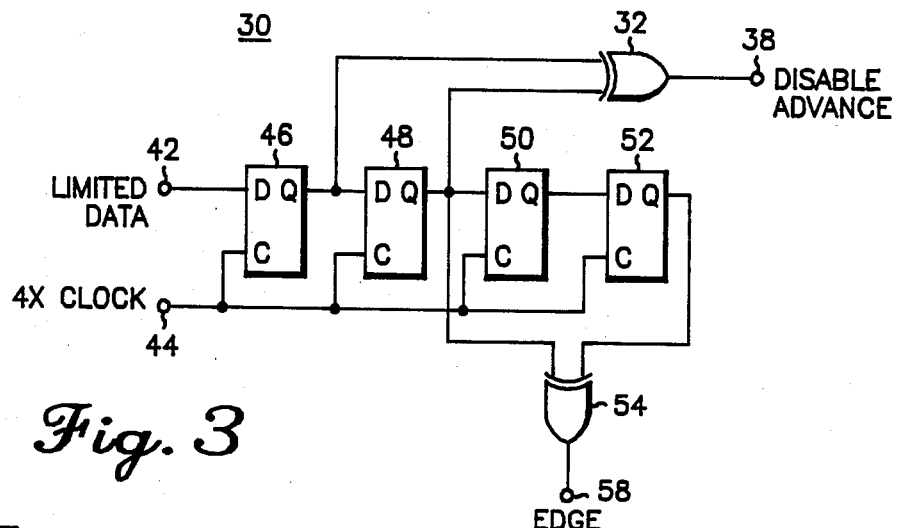
FIG. 3 is a detailed electrical schematic of the disable advance and the edge detect signal generator of the automatic clock recovery circuit of the present invention.

FIG. 3 shows an electrical schematic of the sampling portion of the automatic clock recovery circuit 18 of FIG. 1. The limited data signal of FIG. 1 is coupled to flip-flop 46 through terminal 42. Flip-flops 46, 48, 50 and 52 form a four stage shift register which is clocked at four times the data rate with a sampling clock signal coupled to terminal 44. During a given clock cycle, the output of flip-flop 52 comprises the sample 1 output shown in FIGS. 2a and 2b. The outputs of flip-flops 50, 48 and 46 comprise samples 2, 3, and 4, respectively. During subsequent clock cycles, the output of flip-flop 52 comprises samples 1 through 4 with each sample clock respectively. Otherwise stated, the output of flip-flop 52 comprises samples 1 through 4 with one, two, three or four clock delays. EXCLUSIVE-OR gate 32 compares the outputs of flip-flops 46 and 48 and provides a disable advance signal at terminal 38. EXCLUSIVE-OR gate 54 compares the outputs of flip-flops 48 and 52 and provides an edge signal, at terminal 58. Edge provides an indication at every transition of the limited data signal.

Figure 4:
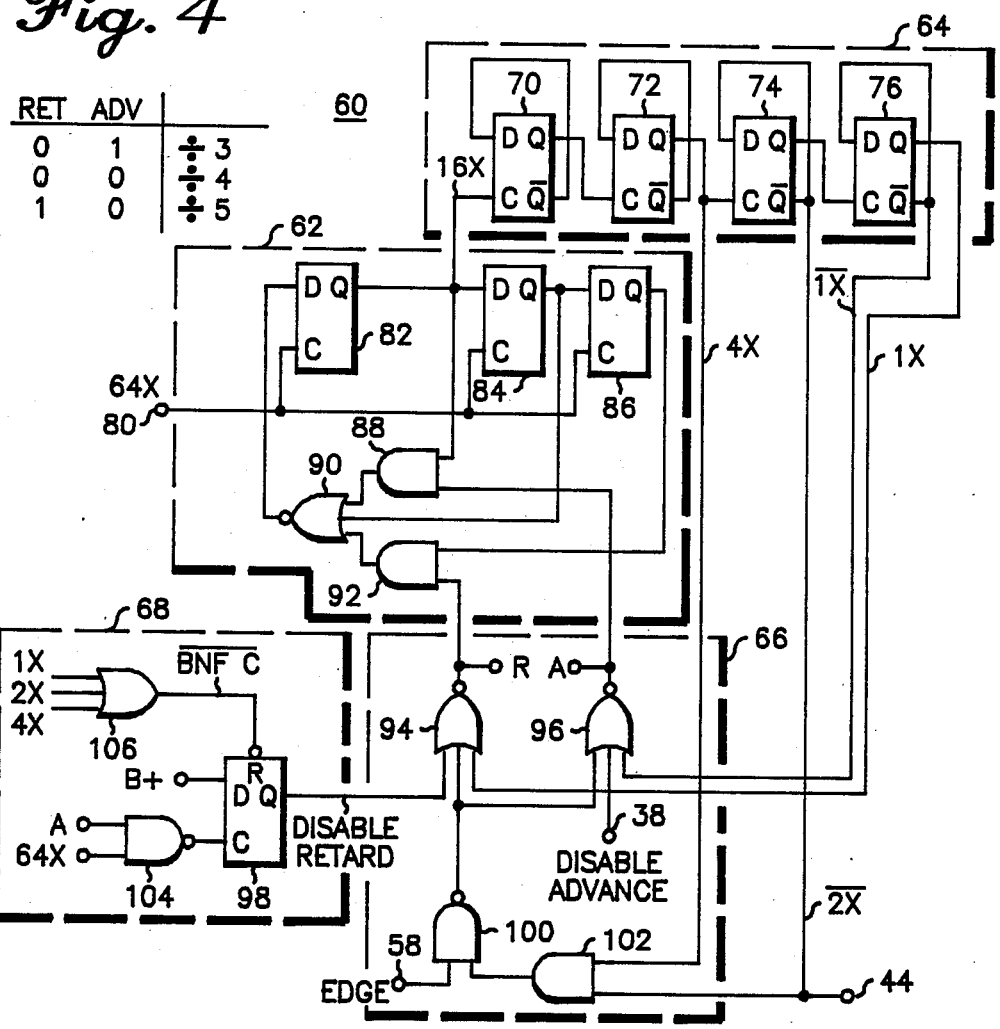
FIG. 4 is a detailed electrical schematic of the local clock phase adjustment network of the automatic clock recovery circuit of the present invention.

Referring now to FIG. 4, there is a detailed electrical schematic of the logic required to implement the clock adjust circuit 60 and disable retard generator 68 of the present invention of the automatic clock recovery circuit 18 in FIG. 1. According to the preferred practice of the present invention, the clock adjust circuit 60 includes a programmable frequency divider 62, a multiple tap frequency divider 64, a disable retard generator 68 and a control circuit 66. Reference timing is provided by a 64X clock.

The programmable divider circuit 62 adjusts the phase of the recovered clock signal by programmably switching between a plurality of divide ratios, as instructed by the control circuit 66. If no phase correction is required, the programmable divider provides an output signal at one-fourth the frequency of a 64X reference clock. The multiple tap frequency divider 64 is coupled to the programmable frequency divider output and provides an output signal comprising the 1X recovered clock signal, and 8X, 4X and 2X clock signals. The 4X clock signal is used to operate the 4X sample clock of FIG. 3.

The programmable divider 62 can be switched between divide ratios of 3, 4, or 5 as determined by the control signals advance, A, and retard, R shown in FIG. 4. AND gate 92 is coupled to the retard control signal and the output of flip-flop 86. AND gate 88 is coupled to the advance control signal and the 16X output of the programmable divider circuit. NOR gate 90 combines the outputs of AND gates 88 and 92 and controls the data input to flip-flop 82. Therefore, if the phase of the recovered clock signal should be advanced, the programmable divider is set to divide-by-three. If the phase of the recovered clock signal should be retarded, the programmable divider is set to divide-by-five.

The disable retard generator circuit 68 is formed by flip-flop 98, OR gate 106 and NAND gate 104. The disable retard circuit generates an output signal whenever an advance signal has occurred. Flip-flop 98 will maintain the disable retard signal until being reset by OR gate 106 which is activated after every recovered clock cycle. Whenever flip-flop 98 has been set, the output of NOR gate 94 will be inhibited and no clock retards can occur.

The control circuit 66 generates the retard and advance control signals used to control the programmable divider 62. NOR gates 94 and 96 are coupled to the 1X and the $\overline{1X}$ clock signal respectively. NAND gate 100 combines the edge signal with the 4X and $\overline{2X}$ output of AND gate 102. The output of NAND gate 100 is applied to NOR gates 94 and 96 to allow clock corrections to be made only when its output is low.

The correction control logic generates the proper retard and advance signals based on EDGE, Disable retard, disable advance, and the IX, $\overline{IX}$, $\overline{2X}$ and 4X clock signals. If an EDGE signal occurs when 1X, $\overline{2X}$ and 4X are high, the advance output of NOR gate 96 will go high unless the disable advance signal 38 is high. If an edge signal occurs when 1X is low, and $\overline{2X}$ and 4X are high, the retard output of NOR gate 94 goes high unless the disable retard output of flip-flop 98 is high. An advance or retard correction can occur only while $\overline{2X}$ and 4X are high, which is a period of two 16X clock cycles. This produces a phase correction of 1/32 of the 1X clock period.

Figure 5:
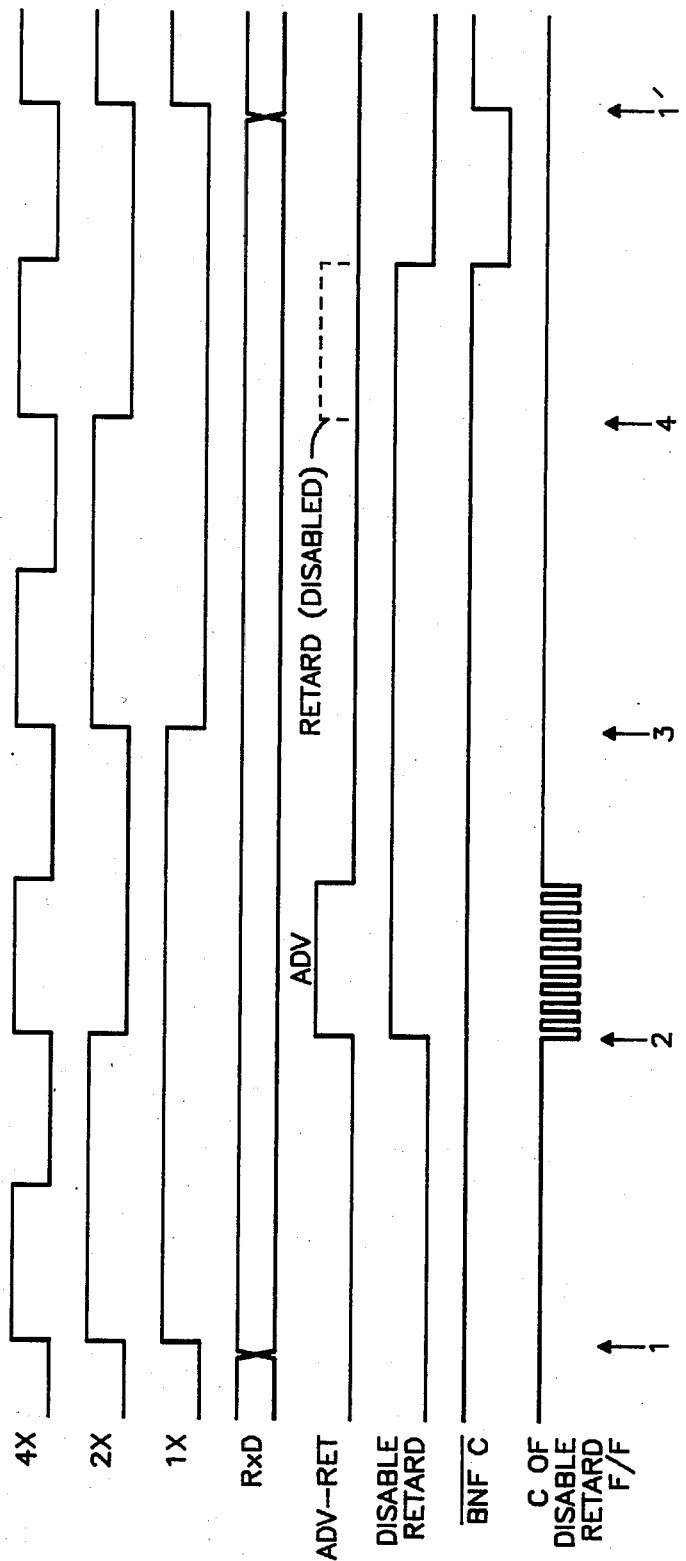
FIG. 5 is a timing diagram detailing the relationships of the various timing signals of the circuit of FIGS. 3 and 4.

FIG. 5 shows a series of timing diagrams of several control signals used in the automatic clock recovery circuit. The lines designated 4X, 2X and 1X are derived from a 64X reference clock signal by the frequency divider 64 of the present invention. As mentioned earlier, advance corrections occur when the 1X clock is high and retard corrections occur when the 1X clock is low. The received data signal, $R_xD$, can be either high or low. The $R_xD$ signal is sampled on the rising edges of 4X with samples 1 through 4 occurring as indicated with respect to 1X. If an advance correction occurs, the disable retard signal is set high, cancelling a retard signal which would occur during the next correcting period. The disable retard signal is then reset by a pulse occurring at the recovered clock rate. The disable retard clock is the output of NAND gate 104 of FIG. 4 and is used for reclocking the advance signal.

In summary, an automatic clock recovery circuit has been described. The automatic clock recovery circuit samples a limited data signal and advances or retards the sample clock to align the transitions of the received data signal with the transitions of the local clock signal. The automatic clock recovery circuit provides improved acquisition time in the presence of bias distortion and if the clock is initially out of phase. The present invention provides that retard corrections immediately following advance corrections are canceled and if the samples corresponding to the edge of the data signal are not the same an advance correction is canceled. Accordingly, other uses and embodiments will be obvious to one skilled in the art without departing from the spirit and scope of the principles of the present invention.

What is claimed is:

1. A method for automatically aligning the transitions of a local recovered clock signal to the transitions of a recovered data signal, wherein said method prevents a 180° out-of-phase clock lock-up condition during initial bias distortion of a synchronizaton pattern and to provide optimum center sampling of bias distorted data caused by baseline wander after synchronization, said method comprising the steps of:

(a) sampling the recovered data signal with a derived clock signal generated from said local recovered clock signal, said derived clock signal having a rate at a multiple of said local recovered clock signal frequency;

(b) determining from the samples the phase of the recovered data signal with respect to the local recovered clock signal;

(c) advancing the phase of the local recovered clock signal if the phase of the local recovered clock signal lags the determined phase of the received data signal;

(d) retarding the phase of the local recovered clock signal if the phase of the local recovered clock signal leads the determined phase of the received data signal; and (e) disabling a retarding step only if an advancing step occurred during the previous clock cycle.

2. The method of claim 1 wherein said method further includes the steps of:

(f) storing a group of samples; and (g) inhibiting an advancing step if at least two transitions occurred in the received data signal between three consecutive data samples in said stored predefined group of samples.

* * * * *